March 30, 1965     M. E. STECZYNSKI     3,175,850

WIDE ANGLE THREAD AND METHOD OF FORMING SAME

Filed June 8, 1961     3 Sheets-Sheet 1

INVENTOR:
MYRON E. STECZYNSKI
BY
ATT'Y

March 30, 1965  M. E. STECZYNSKI  3,175,850
WIDE ANGLE THREAD AND METHOD OF FORMING SAME
Filed June 8, 1961  3 Sheets-Sheet 2

INVENTOR:
MYRON E. STECZYNSKI
BY
ATT'Y

March 30, 1965   M. E. STECZYNSKI   3,175,850
WIDE ANGLE THREAD AND METHOD OF FORMING SAME
Filed June 8, 1961   3 Sheets-Sheet 3
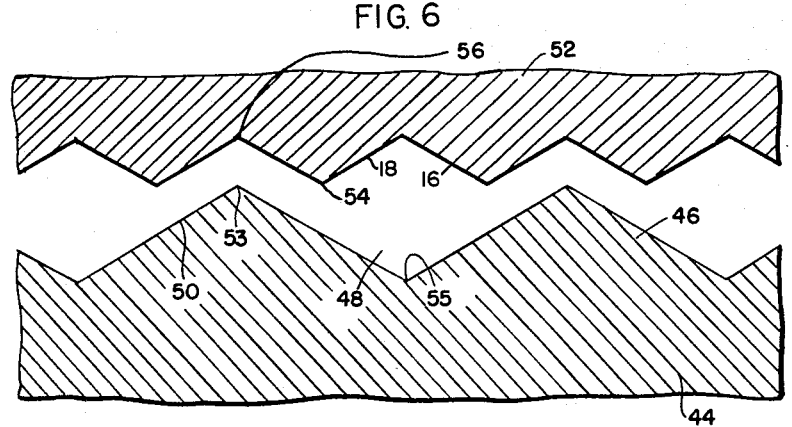
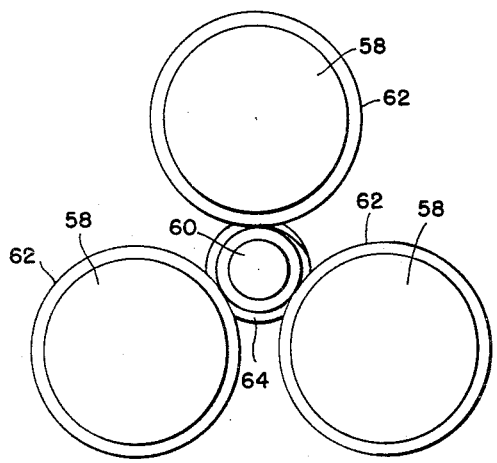
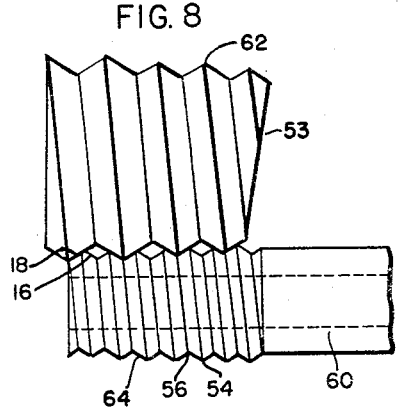
INVENTOR:
MYRON E. STECZYNSKI
BY
ATT'Y

United States Patent Office 3,175,850
Patented Mar. 30, 1965

3,175,850
WIDE ANGLE THREAD AND METHOD OF
FORMING SAME
Myron E. Steczynski, 4154 N. Le Claire, Chicago, Ill.
Filed June 8, 1961, Ser. No. 115,805
2 Claims. (Cl. 285—333)

This invention relates in general to taper pipe threads for universal application in sealing connections of pipes, tubular members, mechanical parts and provides wrench and interference fits for studs and similar members having either straight or taper threads and in particular relates to a wide angle thread having an included angle greater than 90°.

Most of the basic thinking, about threaded elements in the past, not only in America, but in other countries, has been towards screw threads so that they are now well defined and standardized. Pipe threads, although standardized, have never been give thorough consideration. The primary function of a pipe thread is to seal with a form which will most directly and most economically perform this function.

Generally speaking, pipe threads were developed directly from the screw thread concept. The pipe thread usually follows a screw thread form, except that it is wound around a conical or tapered surface instead of around a cylindrical or parallel surface. The conical surface causes pipe threads to wedge tighter and tighter as the mating parts are wrenched together, the wrenching effect causing any interfering elements on the mating members to crush and to form the desired seal. With the concept of a conical surface for pipe threads, elements entirely different from those involved in the screw thread become predominant and reqirure a different approach to attain the desired functional seal.

Practically all of the conventional screw threads and pipe threads in use today provide a contour wherein the sides form an included angle of 60° or less. However, there are practical limitations to such threads being sharp at their crest and their roots, consequently the crest and roots of these 60° threads have been either flattened or rounded.

In the case of screw threads, there is an intentional clearance at the crest and at the roots; however, in the case of pipe threads, an effort is made to control the dimensions of the flats or the radii so that when mating threads are assembled a leak-proof joint is formed. The crests and the roots of pipe threads are entirely dependent on the form of the tools, and if these are faulty, it becomes quite complicated to control or to gage the contours of the ever changing conical diameters.

Ordinary pipe threads which meet recognized specifications may provide either a clearance or an interference at their crests and roots when the sides of the threads are engaged by hand. A special form of these threads commonly referred to as "Dryseal," calls for roots which are somewhat flatter than their crest, to provide an interference, and consequently a crushing action before the sides of the threads come together. Therefore, it is readily apparent that anything than can be done to eliminate the necessity of precise control of crest and root truncations or the measurement either on the fabricating tools or on the product itself, is of utmost desirability.

As previously mentioned, the function of pipe threads is quite different from that of screw threads. Screw threads in most cases act as fasteners. Pipe threads' primary requirement is to seal. The predominant load in screw threads, as is well known, is along the axis of the member. Pipe threads withstand no predominant axial loads; they are subjected primarily to radial forces set up due to wrenching of the tapered thread. At the threaded joints, pipes are in compression and the couplings are in tension.

It is therefore, the primary object of this invention to provide a new wide angle V-thread which eliminates the necessity of precise control of additionally allocated crest and root truncations yet provides a greater sealing effectiveness than the conventional pipe threads in use today.

A specific object of this invention is to provide a new wide angle V-thread having a shallow contour permitting utilization of conduit or pipe having a wall thickness substantially less than the standard pipe required for conventional threads.

Another object of this invention is to provide a new wide angle V-thread which reduces the linear contact surface of mating threads to provide greater effectiveness of sealing.

A further object of this invention is to provide a new wide angle V-thread that provides sharp crests and roots which eliminates the troublesome allocation of flats and radii characteristic of conventional threads.

Still another object of this invention is the provision of an interference fit on a wide angle, shallow, straight or taper thread on studs and screws with a larger and stronger root diameter of a more sweeping form.

A further object of this invention is to provide a new wide angle V pipe thread that is of simple, wide open, shallow design; rugged in construction, economical to form, eliminating added restrictions of precise tools and gaging; yet providing maximum sealing effectiveness with mating threads.

Another object of this invention is to provide an improved method for forming a wide angle V-thread.

A further object of this invention is to provide an improved method for forming a V-thread wherein the direction of tool wear or error is in the direction of a tighter or more positive leak-proof seal with mating threads.

The foregoing objects, together with other objects and advantages of the invention, which will be more fully apparent from the following description, considered in connection with the accompanying drawings in which:

FIG. 6 is a fragmentary sectional view illustrating the relationship of the wide angle V-thread of this invention relative to a cutting or rolling tool by which the threads are formed;

FIG. 7 is a fragmentary end view illustrating the relationship of a pipe member in conjunction with a plurality of roller members to form the wide angle V-thread of this invention on the pipe member; and FIG. 8 is a fragmentary view in side elevation illustrating the relationship of one of the rollers and the pipe member illustrated in FIG. 7 while forming the threads.

Taper threads may be broken down into two prime machine elements; the wedge and the screw, both of which form a compact and efficient combination to exert a sizeable radial force. It is the taper of the wedge that is the prime factor in providing the radial force which acts to seal. The taper is essential to establish the predominant radial force.

The threads merely act as a screw to move the parts together and provide positive, rather than frictional means of holding the parts axially. Many forms could be used for the threads themselves; it is merely a matter of the most economical way of matching two surfaces with grooves or ridges that would complement each other without voids when assembled.

In pipe threads, the usual taper on the diameter is one in sixteen, so that on each side the taper is one in thirty-two. When the work done by the wrenching force is balanced against the resisting force, it becomes obvious that for the very small increase in diameter per turn, the radial force becomes tremendous.

The following description primarily compares the wide angle V-thread of this invention with the conventional 60° V-thread that has been universally accepted. It is to be understood that this is by way of example only to aid in illustrating and highlighting the inventive concept and the advantages of this invention.

Figure 1:
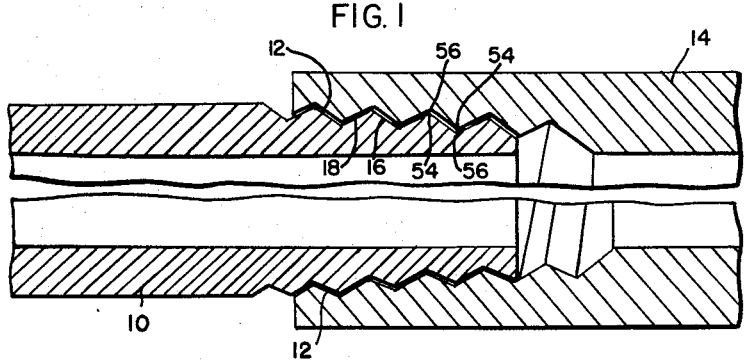
FIG. 1 is a fragmentary sectional view of pipe elements joined with wide angle pipe threads embodying the invention illustrating cross-sectionally of the threads the interface mating relationship between the threads.
Figure 2:
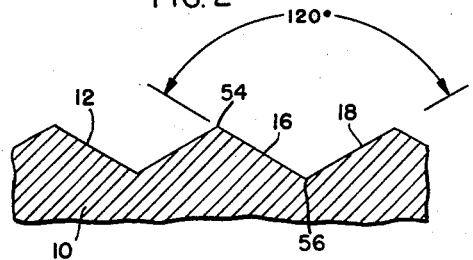
FIG. 2 is an enlarged fragmentary sectional view illustrating the wide angle V-thread of this invention.

Referring primarily to FIGS. 1 and 2, a pipe member 10 is provided with a wide angle taper V-thread 12 of this invention adjacent one end. Threadably engaged therewith is a coupling member 14 having internal taper wide angle V-threads 12 in complementary relationship with the threads on the pipe member 10 with the interface therebetween having straight flank portions of equal axial length opposite one another and the flank portions of each thread alternately defining wide angle crests and roots at their edges. As shown in FIG. 2, the preferred form of the wide angle V-thread of this invention provides flanks 16 and 18 which form an included angle of 120° for a root 56 between thread turns 12 on one member 10 and a crest 54 on the thread turn on the mating member 14. The relationship of the preferred 120° included angle will be readily understood as the description continues in which all flanks 18 are parallel and all flanks 17 are parallel as in the case with conventional V-pipe thread flanks.

Figure 3A:
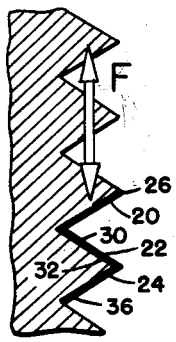
FIG. 3a is a fragmentary pictorial view, similar tor that shown in FIG. 3, illustrating the relationship of the predominant axial force acting on a bolt and nut having the conventional V-thread.
Figure 3:
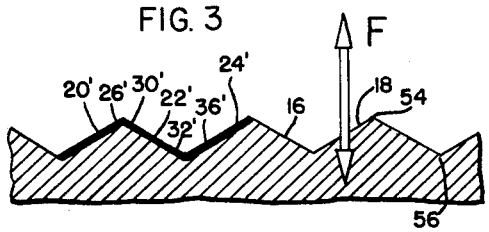
FIG. 3 is a fragmentary pictorial view illustrating the relationship of the predominant radial force acting on a pipe and coupling having the wide angle V-thread of this invention.

Referring now to FIGS. 3 and 3a, for a comparison of the predominant forces and the angular relationship between the wide angle V-thread of this invention and the conventional 60° V-thread, it is to be noted that the fragmentary view of a 60° V-thread in FIG. 3a illustrates a directional force F in the axial direction and the fragmentary sectional view of the 120° wide angle V-thread of this invention in FIG. 3 illustrates a directional force F in the radial direction. The 60° screw thread in FIG. 3a has been purposely shown having three of the flanks on the thread in heavy lines with the first flank indicated by the numeral 20, the second flank indicated by the numeral 22 and the third flank indicated by the numeral 24. The three flanks are then transposed or translated over to the 120° pipe thread in FIG. 3 and are similarly indicated as flanks 20', 22' and 24'.

It is to be noted, that the angular relationship between each of the flanks 20, 22 and 24 of the 60° thread in FIG. 3a is not maintained when translated to form the wide angle thread in FIG. 3, but of utmost importance, it is to be noted that the angular relationship of the predominant force F to each of the flanks remains exactly the same. Further comparison of FIGS. 3 and 3a shows that the crest end 26 of flank 20 in FIG. 3a connects with the root end 30 of flank 22 when transposed to FIG. 3 and in like manner, the crest end 32 of flank 22 in FIG. 3a connects with the root end 36 of flank 24, when transposed to FIG. 3. Thus, it is readily seen that although the angular relationship of the flanks to one another has changed, from 60° to 120°, the angular relationship of the predominant force F relative to the flanks remains the same except the force is now, in FIG. 3, in the desired radial direction rather than the axial direction as seen in FIG. 3a.

Inasmuch as the forces acting on pipe threads are entirely different from those acting on screw threads, being radial rather than axial, it is logical that the form of thread should be entirely different, being orientated toward the radial force and not toward the non-existing axial force. If the 60° screw thread has proven satisfactory for axial loads, then this same angular relationship to the predominant mating force should exist for pipe threads.

In the 60° screw thread with axial loading, the threads are inclined at 60° to the predominant force. It is only logical that in a pipe thread, the thread surfaces should have the same inclination to the predominating force. If the predominant forces, in both instances, are shown vertically, as seen in FIGS. 3 and 3a, the threads extend upward in the case of the screw threads and sideward in the case of pipe threads. In this way, if the inclination of the threads to the predominating force is not changed, the pipe threads have an included angle of 120° and not of 60°. This is readily understood from the previous explanation of the darkened flanks 20, 22 and 24 of the 60° thread relative to their position on the 120° pipe thread as indicated by the heavy flanks 20', 22' and 24'. Thus, the predominating force is maintained at exactly the same angular relationship except when transferred to the wide angle pipe thread of this invention, a 120° included angle is created.

Therefore, since the 120° V-thread on a pipe retains the same inclination towards its predominating radial force as the 60° screw thread bears towards its axial loading, it requires a 120° V-thread on a pipe to accomplish exactly what a 60° V-thread does on a screw.

With any 60° V-thread, the forces normal to the thread surface, may be resolved into their axial and radial components, where the axial component is .866 times the normal force and where the radial component is .500 times the normal force. In a 60° screw thread, where the load is axial, its useful component, .866 times the normal force, is significant in supporting the load but its radial component, .500 times the normal force, is wasted as far as supporting the load is concerned.

In a 60° pipe thread, where the predominant force is radial, the load is distributed uniformly on both sides of the thread. Its useful component, .500 times the normal force, is but half of the normal force, where the larger axial component, .866 times the normal force, balance each other on both sides of the thread and are wasted as far as contributing to the radial sealing of the wrenched connection. Hence, the 60° V-thread is quite suitable for screw threads as fasteners, but does not lend itself for use as a pipe thread to provide a positive seal.

Applying precisely the same reasoning for the 120° wide angle V-thread of this invention as applied to the 60° thread, in resolving the normal forces into their axial and radial components, the conditions are reversed. The axial component is only .500 times the normal force and the radial component is .866 times the normal force.

If a bolt with axial loading had the 120° V-thread, its useful component would be only .500 times the normal force; only half of the normal force acting on the sides of the thread, whereas its radial component would be the larger, .866 times the normal force and would be wasted as far as contributing to the support of the useful load.

In a 120° taper pipe V-thread, however, where the imparted force is radial, so that it is distributed on both sides of the thread, its useful radial component is a significant .866 times the normal force, and its wasted axial component .500 times the normal force is decidedly smaller and balances out on each side of the thread. This is the mathematical relationship why the 120° wide angle V-thread of this invention is more suitable for pipe threads and not nearly as suitable for screw threads acting as fasteners.

The comparison above has been between the 60° screw thread, whose angle is likewise used as the basis of the present conventional pipe thread, and the 120° V-thread of this invention. From the foregoing description it is readily apparent why the 120° V-thread provides substantially the ultimate in attaining the desired radial force to provide the necessary seal. By way of example, in a 90° thread, the radial component would be equal to the axial component. To develop a radial component having twice the magnitude of the axial component, the thread angle would have to be 126° 52′. If a 150° thread was used, the radial component would be 3.73 times the axial component and would provide an adequate solution if the axial load would be insignificant. If the thread angle were 151° and stressed radially, it would be the counterpart of the common 29° Acme thread with its efficient disposition of axial loading. Both the 150° and 151° threads would be only half as deep or would be produced by removing only half as much material as for the 120° thread and could be suitably used on exceptionally thin wall pipe.

With a wide choice of angles over 90° and up to 151°, the 120° thread of this invention appears to be the most suitable comprise since its ratio of radial component to axial component is three times as great as the corresponding ratio for the conventional pipe thread. Going to an angle larger than 120° increases the radial component very little, yet reduces the axial component appreciably. In other words, there is little advantage to be gained from deviating from the angle of 120° in general pipe thread applications.

The open shape and shallowness of the 120° thread of this invention readily permits it to be machined by various processes. Its simple open V-form gives greater assurance of continuous contact for sealing by the omission of the troublesome flats or radii at the crest and roots. The 120° V-thread completely eliminates the complicated truncation elements which characterize the several pipe standards of today and which must be provided because of the practical limitations to cut a perfect 60° V-thread.

The amount of metal removed in cutting a 120° thread is much less than in cutting a 60° thread of the same pitch. By simple triangular calculation, it can be readily seen that in cutting a 120° V-thread only one-third of the metal is removed as compared with the metal removed in cutting a 60° V-thread of the same pitch. Realizing that the top portion of metal removed for the 120° V-thread is the easiest to remove, it becomes evident that the task is even simpler than a mere analytical comparison would indicate.

The depth of the 120° V-thread is only one-third the depth of a 60° V-thread of the same pitch. Again this relationship can be determined by simple triangular calculation. The significance of this relationship is far reaching because the new 120° shallow V-thread is readily adapted for use on thin pipes and tubing which are much lighter than the standard pipes requiring the conventional 60° thread. An incalculable amount of standard pipe is now being used wastefully for light pressure work, such as domestic gas, or for atmospheric pressure such as drains, only because it is the lightest pipe that can be threaded conveniently with the present 60° pipe thread.

This reduction in the thickness of the pipe for which the 120° V-thread is applicable becomes more evident in parts which are bored and tapped since it permits a larger diameter to be provided than corresponding parts having the same size and pitch of the conventional 60° thread. Further, parts which are threaded externally with the 120° V-pipe thread have a larger minor or root diameter than corresponding parts with the same size and pitch as the conventional 60° thread. This permits a larger opening for the same net thickness below the roots. Therefore, the parts are not only lighter but the larger bore provides a greater flow capacity.

Although conventional 60° pipe threads are used on standard, extra strong and double extra strong pipes, they cannot be used on pipes thinner than standard. Such thinner pipes and tubing today are now joined by welding, soldering or by forming, or by the clamping action of a more complicated fitting. Inasmuch as the 120° V-thread of this invention of the same pitch as a 60° thread is only one-third as deep, it may be readily cut or rolled on thin pipes and tubing and still leave sufficient wall to carry the pressure within the pipe. The use of the lighter thin pipes may be the deciding consideration for application on planes, ships, vehicles, bridges and similar applications. Likewise, the use of alloy steels, the possibility of rolling the threads, and cost reduction in general may be further considerations in the choice of thin wall pipes having the wide angle V-thread of this invention.

The imperfect threads or vanishing threads on the forward end of a die or cutter, or at the point of a tap, are created by the chamfer on the tool to help it enter the work to start the cutting process. Such a chamfer produces threads which are too full at the roots to engage a mating thread; therefore, they project along the length beyond the connection proper.

If these vanishing threads abut against a shoulder, the length of the work equal to the length of vanishing threads is wasted. If the vanishing threads extend into a blind hole, the hole must be drilled sufficiently deeper and the tap must be rotated farther to provide the extra threads. In all cases, the effort to produce the vanishing threads beyond the connection proper cannot be termed useful as the pipe joint proper.

Figure 4A:
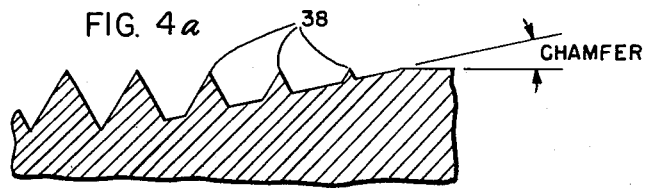
FIG. 4a is a fragmentary sectional view, similar to that shown in FIG. 4, illustrating the formation of vanishing threads on a conventional V-thread.
Figure 4:
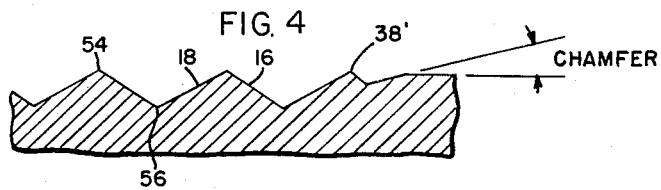
FIG. 4 is a fragmentary sectional view illustrating the formation of vanishing threads on a wide angle V-thread.

Referring to FIGS. 4 and 4a, FIG. 4a illustrates the vanishing threads 38 on the standard 60° thread while FIG. 4 refers to the vanishing threads 38′ on the 120° V-thread on this invention. Thus, by comparison of the 60° thread and the 120° thread of the same pitch, where the tools for cutting these threads are ground to the same chamfer angle, with the 120° thread cutting in only one-third the depth of the 60° thread, it is apparent that the length of the vanishing thread will also be one-third of that of the 60° thread, one thread instead of three threads as shown by the comparison of FIGS. 4 and 4a. Thus, it is seen that there is a net saving of two full threads. It is also apparent that this is a very vital consideration effecting economy of design, cost of production as well as appearance.

Figure 5A:
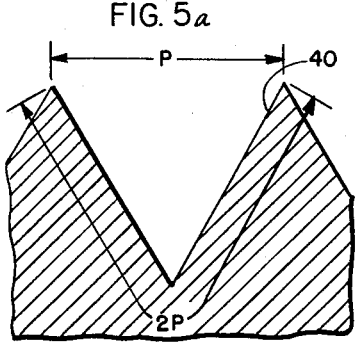
FIG. 5a is an enlarged fragmentary sectional view, similar to that shown in FIG. 5, of a conventional V-thread illustrating total sealing surface relative to thread pitch.
Figure 5:
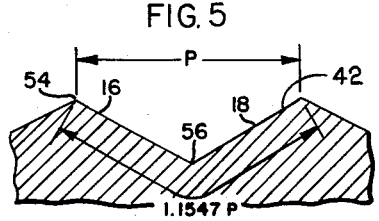
FIG. 5 is an enlarged fragmentary sectional view of the wide angle V-thread of this invention, illustrating total sealing surface relative to thread pitch.

Referring now to FIGS. 5 and 5a, a comparison between the two, a 60° thread indicated by numeral 40, and the 120° thread of this invention indicated by the numeral 42, is made to illustrate the length of surface in contact when forming the desired seal. The length of contact surface within a given length of thread has a bearing both on the length of edge of the cutting tool and on the length of the sealing surface. Reducing the amount of linear contact means less surface to machine and a smaller, but more efficient, sealing surface. The surface on the 120° thread is not only shorter, but the angle is more open, so that it is easier to machine than the 60° thread which has a longer surface and a more inaccessible angle where flaws, voids and deviations are more likely to occur. The wide angle 120° V-thread has a theoretically perfect outline to assure a matching relationship and an intimate contact for better sealing. Again, by simple mathematical calculations, it can be shown that the contact edge or surface for the 120° V-thread is 42% shorter than the conventional standard 60° V-thread of the same pitch.

A further and rather obvious advantage of the 120°

V-thread of this invention lies in the ease and the more complete plating of the threads. In plating, the direction of travel of the charged particles (ions) is normal to the surface of the part being plated. This is explained by the fact that this is the shortest distance that the charge can travel.

In screw threads, the crest or point gets the heaviest deposit because it draws the charge from a fanned arc within normals to the sides of the thread. Thus, for a 60° thread, the crest attracts the charged particles from a 120° arc and consequently the deposit at the crest is decidedly heavy. As the particles move along the sides of the thread, each spot draws the charge in a normal direction; but as we approach the root there is an overlap of attraction to both sides of the thread, so that the amount of plating is decidedly diminished. Near the very root of the thread, the zone from which the charge can be drawn becomes quite limited and each particle is not only divided between the two sides, but the zone of supply narrows down to the point where there is little left to be deposited at the root.

The 120° thread provides a decided advantage in that the tip draws the charged particles from an arc of 60°, which arc is only half that created by the conventional 60° thread. The threads are more open to the extent that the charges for the most part have room to travel normal to the sides of the thread. It is only near the root of the thread that the zone is limited and the charges supply less than the average amount of plating. Consequently, the 120° thread offers a more open surface for receiving a uniform thickness of plating than the conventional 60° thread.

Another feature which varies the use of the 120° V-thread of this invention as compared to the conventional 60° V-thread is that the crystal lattice of graining of the metal structure of pipes runs axially and offers greater resistance to cutting across the grain than with the grain. The 120° V-thread offers a double advantage; first, it requires removal of less metal and second, the cutting is at an angle that tends to follow the direction of the crystal lattice or grain instead of against or across the grain.

In addition, it is generally understood that sharp corners and abrupt changes are conducive to microscopic flaws. These are the places where incipient cracks form and later open up to actual breaks and tears causing failure. In the case of screw threads in tension, there is a concentration of stress at the root; this is greatly affected by the thread angle, sharpness at the root and smoothness of finish. The concentration of stresses is intensified since the stress is greatest where the cross-section is the smallest. Any modification that tends to smooth out or eliminate the internal stresses, or blends the stress areas in the direction of the grain makes a stronger overall section. Thus, it is readily understood that the concentration of internal stresses will be much greater in the conventional 60° thread since the angle provides a rather sharp angle whereas the 120° V-thread of this invention is more open with a greater angle which will reduce the concentration of the internal stresses at the root.

Further, rolled threads are acknowledged as being superior to cut threads. They may be produced by squeezing the metal from the dedendum into the addendum, thereby raising the major diameter from the original cylindrical body diameter. In this process, there are no chips and likewise no waste. In rolled threads, the fibers of the material form continuous, unbroken stress lines which follow the thread contour and which are not severed across as they are in a cutting process. These stress lines resist shear by being aligned against the acting stress rather than with it. The rolling action likewise compresses and burnishes the thread smooth, thereby eliminating the common starting points for fatigue and failure. In tracing the grain structure of the 60° V-thread versus the 120° V-thread, it is readily understood that the grain following the contour of the thread is more severely distorted in a 60° V-thread than in the 120° V-thread. This means that the internal stresses are greater and that the greater and sharper changes in direction of the grain weaken the structure by being more susceptible to cracking. The stress lines or grain in the 120° V-thread flow more evenly with the initial position of the grain in the pipe and blend more smoothly with the grain below the roots of the threads and into the unthreaded length of the pipe.

The ease with which the 120° V-thread can be rolled or formed, makes it especially suitable for all pipe. Cutting of the threads locates the entire form thereof below the original outer diameter of the pipe or tube, so that the remaining wall is thinner by the entire height of the thread. Rolling the thread instead of cutting, raises the addendum above the original outer diameter and presses the dedendum for the other half of the thread, so that the remaining wall is thinner by only half of the height of the thread.

The raised addendum has its own beneficial effect in taper pipe threads by raising the major diameter at the large end of the tapered thread above the outside diameter of the pipe and thereby provides threads of full form where cut threads would be imperfect at their crest. These extra full threads extending above the original outside diameter of the pipe provide added elements for sealing.

All tools and griding wheels utilized in forming threads, have a tendency to wear faster at their point than along their flat edge, so that the point becomes rounded. As a general rule, a point with a wide angle, due to its relative massiveness and its ability to dissipate heat faster, does not wear as rapidly as the point having a sharper angle. Consequently, it can be expected that the equipment for cutting the 120° wide angle V-thread of this invention will retain its shape longer to produce more accurate contours than corresponding equipment for producing the sharper 60° V-thread. Deviation from full sharpness of the cutting tool has a very important bearing on the resulting shape of the thread on the product which, in turn, effects the fit or misfit of mating connections. If the resultant assembly produces a void at the mating crest and roots, the 60° thread would require a greater amount of wrenching than the 120° thread to close the void, provided metal would not flow from elsewhere.

As previously explained, in rounding out from a sharp point to a given radius, the 60° tool will wear much faster than the 120° tool. The void between the mating root and crests may be readily calculated and it is obvious that with the greater wear on the tools for the 60° V-thread the chance for mis-alignment or mis-fit of the parts will create a greater area for fluid to leak past than in the 120° V-thread. Thus, the 120° V-thread will provide a better or almost perfect sealing relationship, not only in its perfect sharp form, but even in its defective flat or rounded form. The thread is closer fitting even when it is deformed and will make up pressure tight with fewer wrenching turns than the 60° thread.

A method of alternate slicing is made possible by the rugged shape of the wide angle V-thread which is so open that it requires no truncations at its crests and roots. The flatness of the faces of the 120° V-thread avoids the steepness and sharpness of the 60° V-thread. It is significant to note that the 120° included angle of the wide angle V-thread of this invention is equal to the one formed by the flat at the crest or by the flat at the root with one of the flanks of a truncated 60° thread, and is well recognized as a workable element. As long as the 120° angle already is equal to the corner angle achieved by truncating the 60° thread, further truncation of the 120° V-thread is unnecessary and undesirable.

Referring now to FIG. 6, the absence of the specific truncations on the threads makes it possible to develop tools, indicated by the numeral 44, with staggered, double sized threads 46 where only their addendum does the actual cutting and where their dedendum provides a clearance 48 at all times. This large clearance 48 acts as a space for the chips to form and also as an oil passage to lubricate the oncoming cutting point. With this large free space and with an unhampered tool edge 50 which extends past the work itself, the cutting action has a tendency to shave or slice, first one set of alternate spaces and then the other set on a product 52. It is this provision for clearance and the staggered arrangement of continuous cutting edges on successive cuts that provides the alternate slicing method.

The alternate slicing action at the continuous edges 50 of the thread on the tool 44 creates a sharp crest 54 on the product, and entirely eliminates the need for special care in maintaining a sharp root 55 on the tool. The root 56 of the product 52 is produced by the crest 53 of the tool, just as in any method of cutting threads, but here the crest 53 of the tool 44 is sharp and needs no particular truncation.

In this alternate slicing method for the formation of wide angle threads, where the tool has its thread twice the size of those on the resultant product, as previously explained, the threads on the tools are staggered in each succeeding row, so that the tools, by alternate cutting actually cut twice their number of threads on the product. The above arrangement requires an odd number of flutes on the tool, and requires that the lead of the thread on the tool be equal to the pitch on the product. If the tool has a lead equal to half its pitch, it will require two turns to advance through its own pitch. This phenomenon is made possible with the staggered threads where the tools are ground by skipping every alternate flute.

It would be theoretically possible to design this same alternate slicing method for 60° threads, but would not be practical since the sharp point on the tools could not be maintained to cut sharp roots on the product. Likewise, a burr or sliver may be formed as the tool sliced the acute angle at the crest of the product. Furthermore, such a sharp 60° V-thread would not be interchangeable with existing 60° threads since all standard threads have flats.

Recognizing the inability to maintain sharp 60° V-threads, such threads have been intentionally truncated or rounded. Trying to maintain a precise truncation at the crest and root of 60° threads, whether they are pipe threads or screw threads, has been a source of difficulty in manufacturing and in insuring functional performance. In an effort to overcome difficulties with truncation, practical changes have been made in the 60° thread, such as the Dryseal pipe thread previously mentioned or as the Unified screw thread. These changes are directed away from the 60° sharpness rather than towards it.

The principle of using double size threads in the alternate slicing method just explained is also extended to apply to a double size rolling process where the crest of the threads on the product is formed by the center portion of the side of a thread on a roller. This expedient is made possible by the fact that these threads have no truncations.

Referring now more specifically to FIGS. 7 and 8, the process for rolling the thread is accomplished by rollers 58 having twice the diameter of the pipe 60, with roller threads 62, which are also double the size of threads 64 desired on the pipe and with the helix angle on the pipe 60 and on the rollers 58 exactly the same.

The pipe 60 will make two turns for each turn of the rollers 58, wherein it will have twice the number of threads per inch of length. For any instantaneous position of pipe and roller, the next full turn of the pipe will be in contact with the opposite side of the roller, but one full thread ahead. At another full turn of the pipe, the original contact position of the roller will contact the pipe two full turns ahead.

The threads on the pipe are formed by the addendum of the thread on the roller, so that their root is formed by the sturdy crest of the rollers and their crest is formed by being alternately squeezed by the side of the large thread on the roller. The dedendum of the threads on the rollers is always clear, so no special attention is required to its grinding or maintenance.

It is immaterial, as far as forming of the thread is concerned, whether one, two or three rollers are used, except that three rollers, as illustrated in FIG. 7, are preferred since they form a natural self-centering and balancing grasp on the pipe, helping to guide it and to maintain true form and lead. By making the thread on the roller left-hand instead of right-hand, the rollers could be fed radially instead of axially so that with continuous rolling, the pipe and rollers would not advance axially and the accuracy of the crest could be controlled.

Having set forth the more important advantages gained from the utilization of the 120° V-thread of this invention not only as to its suitability for forming a seal and its inherent advantages in the economic formation of the threads, the wide angle thread as presented provides many unseen developments for use with thin wall pipe. In addition, the relationship of the predominating force to the flank of the thread being the same as prevails in the conventional 60° thread, the 120° V-thread will also find many useful applications in the heavier or thicker wall pipe industry.

The principle of developing a strong radial force with taper pipe threads can also be extended to straight screw threads by making the hole somewhat smaller than the entering member and creating an interference so that a wrench or force fit is required to assemble the parts. Using a 120° thread on studs and tapped holes and modifying this thread if necessary to create voids at the crests and roots or/at the sides of the threads to permit flow of excess material from the crushed zones, gives a larger root diameter and a more sweeping form to strengthen the loaded stud.

The invention as set forth herein for a wide angle V-thread is capable of wide variation within equivalent limits and such variations are contemplated as may be desirable or useful in the particular adaptation of the invention shown and the methods for the formation thereof.

What is claimed is:

1. The combination of male and female pipe members terminally threaded with interengageable mating pipe threads having a standard taper for pipe threads, said interengagement being full and complementary along the interface of the flanks and at the roots and crests of the threads in positive sealed relationship under forces acting on the thread flanks throughout the length of the thread interengagement, said flank interfaces defining cross-sectionally of the threads a line contour in which the flank portions thereof are straight and arranged alternately in two groups in each of which the flank portions are equal and parallel with the ends of the flank portions of one group intersecting the ends of alternate flank portions of the other group at identical included obtuse angles to define sharp crests and roots for both male and female threads with said forces being equal and opposite upon the mating threads at their interface and divided between opposite flanks of each thread, the resolution of said forces being such that the radial component thereof exerted on each flank is substantially greater than the axial component thereof.

2. The combination called for in claim 1 in which the standard taper on the diameter is substantially one in sixteen, said obtuse angle is an included angle of approximately 120°, said radial component is approximately .866 times said forces, and said axial component is substantially .500 times said forces.

References Cited by the Examiner

UNITED STATES PATENTS

| 157,828 | 12/74 | Hoskin | 285—333 |
| 1,464,484 | 8/23 | Richter | 285—390 |

(Other references on following page)

UNITED STATES PATENTS

| | | | |
|---|---|---|---|
| 1,647,037 | 10/27 | Duchesne | 10—1 |
| 1,819,654 | 8/31 | Metcalf | 285—383 |
| 2,051,499 | 8/36 | Siegle | 285—333 |
| 2,094,491 | 9/37 | Janata | 285—390 |
| 2,226,948 | 12/40 | Simons | 80—60 |
| 2,279,579 | 4/42 | McElhinney | 80—60 |
| 2,745,685 | 5/56 | Moore | 285—333 |
| 2,768,393 | 10/56 | Sayce | 10—1 |
| 2,772,899 | 12/56 | Evans | 285—333 |

FOREIGN PATENTS

| | | |
|---|---|---|
| 435,259 | 3/34 | Great Britain. |
| 39,032 | 9/36 | Netherlands. |
| 87,205 | 8/36 | Sweden. |

OTHER REFERENCES

"Handbook of Fastening and Joining of Metal Parts," page 168 (Laughter and Hargan), published by McGraw and Hill 1956. (Copy in scientific library, call numbers TJ–1320–L3).

CARL W. TOMLIN, *Primary Examiner*.